United States Patent [19]
Ward

[11] Patent Number: 5,663,958
[45] Date of Patent: Sep. 2, 1997

[54] METHOD AND APPARATUS FOR DYNAMICALLY SELECTING THE LENGTH OF MOBILE STATION BURST COMMUNICATIONS ON THE REVERSE DIGITAL CONTROL CHANNEL

[75] Inventor: Torbjorn Ward, Montreal, Canada

[73] Assignee: Telefonaktiebolaget Lm Ericsson, Stockholm, Sweden

[21] Appl. No.: 603,860

[22] Filed: Feb. 22, 1996

[51] Int. Cl.$^6$ .................................................. H04B 7/212
[52] U.S. Cl. ........................ 370/347; 370/350; 370/470
[58] Field of Search .................................. 375/285, 356, 375/357; 370/347, 350, 470, 472, 502, 509, 516, 519

[56] References Cited

U.S. PATENT DOCUMENTS

| 4,135,059 | 1/1979 | Schmidt | 370/503 |
| 4,811,420 | 3/1989 | Avis et al. | 455/51.1 |
| 5,299,198 | 3/1994 | Kay et al. | 370/350 |
| 5,307,351 | 4/1994 | Webster | 370/470 |
| 5,357,513 | 10/1994 | Kay et al. | 370/348 |
| 5,377,224 | 12/1994 | Hudson | 375/200 |
| 5,553,077 | 9/1996 | Garcia et al. | 370/350 |
| 5,602,831 | 2/1997 | Gaskill | 370/470 |

*Primary Examiner*—Benedict V. Safourek
*Attorney, Agent, or Firm*—Jenkens & Gilchrist, P.C.

[57] ABSTRACT

The time division multiple access (TDMA) frame time synchronization error for received mobile station burst communications transmitted on the reverse digital control channel is monitored by the receiving base station. A probability density function is then prepared by the base station reflecting the number of instances of each determined length of time synchronization error monitored over a predetermined time period. The probability density function is then processed to identify the percentage of burst communications during that predetermined time period that exceed a synchronization error threshold. If the determined percentage exceeds a given percentage, then abbreviated length burst communication operating mode is ordered by the base station for all mobile stations operating within the cell. Otherwise, conventional length burst communication operating mode is ordered by the base station. The measured time synchronization error is continuously processed to effectuate dynamic control over the specified length of mobile station burst communications.

24 Claims, 5 Drawing Sheets

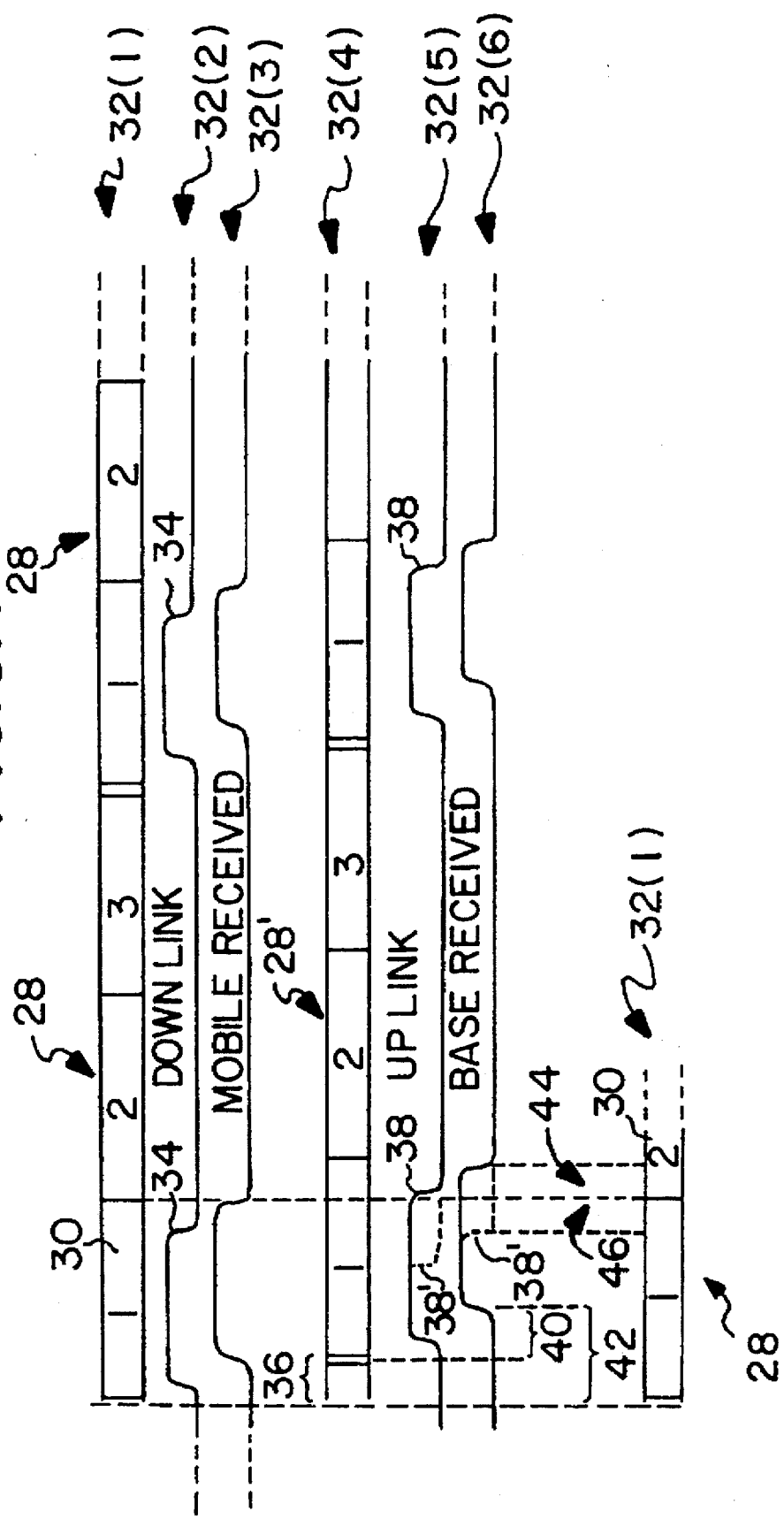

METHOD AND APPARATUS FOR DYNAMICALLY SELECTING THE LENGTH OF MOBILE STATION BURST COMMUNICATIONS ON THE REVERSE DIGITAL CONTROL CHANNEL

BACKGROUND OF THE INVENTION

1. Technical Field of the Invention

The present invention relates to cellular telephone systems and, in particular, to a method and apparatus for improving the capacity of the reverse digital control channel by dynamically selecting the length of burst communications transmitted from a mobile station.

2. Description of Related Art

Every cellular telephone system is provided with a plurality of carrier frequencies for use in carrying communications between mobile stations and base stations. One-half of the carrier frequencies are normally allocated for carrying downlink communications from base stations to mobile stations, and the remaining one-half of the carrier frequencies are allocated for carrying uplink communications from mobile stations to base stations. The carrier frequencies are paired (one uplink and one downlink per pair) and distributed in accordance with well known cellular architecture techniques amongst the plurality of base stations.

Conventional cellular systems have historically been analog in nature with each carrier frequency comprising a physical channel (uplink or downlink) for carrying communications between base stations and mobile stations. In order to increase the capacity of the cellular system for handling communications, currently specified cellular systems are instead digital in nature implementing a time division multiple access (TDMA) communications protocol on each carrier frequency. A repeating TDMA frame (comprised of a plurality of time slots) is provided per uplink and downlink carrier frequency, with each time slot in the TDMA frame comprising a physical channel for carrying burst communications between base stations and mobile stations.

A great variety of information must be transmitted between base stations and mobile stations during cellular system operation. This information comprises both user data (voice traffic) and control signaling that is burst transmitted in certain ones of the time slots in accordance with the implemented TDMA protocol. Digital cellular systems include a number of different types of logical channels that are mapped into the physical channels (time slots) of the TDMA frame, with the logical channels identifying both the type of information that is sent and the order of transmission in accordance with the protocol. For example, user data (such as speech) is sent on the logical channels identified as traffic channels (TCHs). Certain ones of the physical channels in each TDMA frame, and in fact all of the channels in some TDMA frames, are reserved for the traffic channels. Control signaling is sent on the logical channels generically identified as control channels (CCHs). There are a number of different types of control channels. Certain ones of the physical channels in only certain ones of the TDMA frames are reserved for the control channels. Typically, the control channels are provided in the TDMA frames of only one pair of carrier frequencies per base station (cell).

Synchronization of the mobile stations within the cellular system to the repeating TDMA frames on both the uplink carrier frequencies and the downlink carrier frequencies assigned to each cell is vitally important to insuring proper system operation. Accordingly, it is well known for each base station to broadcast, on at least one of the control channels, a synchronization signal (burst) informing the mobile stations of the structure and timing of the TDMA frame. From the received TDMA frame structure and timing information, the location in time of each of the time slots (physical channels as well as logical channels) may be determined by the mobile stations and thereafter used to access the channels at the proper time to initiate and receive burst communications.

Because mobile stations are not located immediately adjacent to the base station, mobile station reception of the broadcast synchronization signal is delayed due to signal propagation delays and a corresponding forward time synchronization error is introduced at the mobile station in the TDMA frame. By this it is meant that the starting time of each time slot in the TDMA frame at the base station is slightly different from (i.e., earlier than) the starting time at the mobile stations. A reverse time synchronization error is also introduced due to signal propagation delays whenever the mobile station transmits a burst communication back to the base station. This mobile station burst communication, at what the mobile station incorrectly believes is the beginning of the selected time slot in the TDMA frame, is however received by the base station slightly after the mobile station TDMA frame time slot starting time, and significantly after the base station TDMA frame time slot starting time.

To account in most situations for the effects of the forward and reverse time synchronization errors, both base station and mobile station burst communications include an end guard period, and thus have a message portion with a conventional length that is less than the length of each time slot in the TDMA frame. With respect to mobile stations located close to the base station, the conventional length burst communication fits within the time slot in spite of any introduced forward and reverse time synchronization errors. In situations where the mobile station is located a much further away from the base station, however, the forward and reverse time synchronization errors become correspondingly quite large, and in fact may exceed the guard period and the time slot protections provided thereby. Thus, with large time synchronization errors, a conventional length burst communication transmitted from a distant mobile station during one given time slot may be received by the base station partially within both the given time slot and a subsequent time slot. Often this time slot interference results in the failure of the base station to receive the burst communication in either or both the time slots.

This time slot interference problem is of greatest concern during initial mobile station contact because the base station has not yet been given an opportunity to provide the mobile station with information directing the advancing of mobile station broadcasts in time and thus accounting for the introduced time synchronization error. One known solution is to have the mobile stations initially transmit a burst communication with a shortened (i.e., abbreviated) message length on the reverse digital control channel. A larger guard period is thus provided and the abbreviated length of the abbreviated burst communication is set to insure base station reception within the proper time slot almost regardless the length of the introduced time synchronization error.

The selection of abbreviated versus conventional length burst communications for mobile station use is typically made by the system operator on a cell by cell basis, with large cells being designated for only using abbreviated length burst communications at initial mobile station access, and smaller cells designated for conventional length burst communications. Control over mobile station operation in this regard is effectuated by transmitting a control message from each large cell base station designating the use of only abbreviated length bursts. This message is periodically sent in accordance with the logical channel assignment in the TDMA frame on the forward control channel. Changing of the abbreviated length designation has historically been made only by the system operator, with such changes being made infrequently, if at all, and only in response to system changes such as a change in the size of the cell.

While solving the concerns with time synchronization errors, abbreviating the message length of initial mobile station burst communications unfortunately adversely affects communications bandwidth (i.e., capacity) of the reverse control channel at initial access. A reduction in reverse control channel capacity of between thirty and forty percent is not unusual in situations requiring the use of abbreviated length bursts during initial mobile station contact with the base station. Another drawback to the use of abbreviated length bursts is that mobile station messages often must be divided into several parts and inefficiently transmitted to the base station during several different reverse control channel time slots. With such multiple abbreviated length bursts, there is a chance that one of the bursts may be only partly received by the base station, if even received at all, thus necessitating a retransmission of the message, again in multiple shortened bursts. Accordingly, it is preferable, even in large cells, that conventional length burst communications, rather than abbreviated length burst communications, be used whenever practical during initial mobile station access to the base station using the reverse digital control channel.

SUMMARY OF THE INVENTION

An expected time for base station receipt of certain burst communications transmitted from mobile stations is determined in accordance with the time division multiple access (TDMA) frame being implemented by a digital cellular telephone system. The actual times of receipt for each of certain mobile station burst communications in the TDMA frame are then evaluated by the base station in comparison to the expected time of receipt to determine time synchronization errors caused by forward and reverse burst communication propagation delays. The time synchronization errors determined over a given period of time are processed to identify the percentage of the certain burst communications received in excess of an error threshold and, in response thereto, dynamically control the length of the certain burst communications. In this connection, if the determined percentage exceeds a given threshold percentage, then the system specifies the use of an abbreviated length for the certain burst communications transmitted by proximately located mobile stations. Otherwise, the system specifies use of a conventional length for the certain mobile station burst communications.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3A is a timing diagram illustrating the introduction of time synchronization errors into the TDMA frame of FIG. 2 by burst communications between mobile stations and base stations;

DETAILED DESCRIPTION OF THE INVENTION

Figure 1:
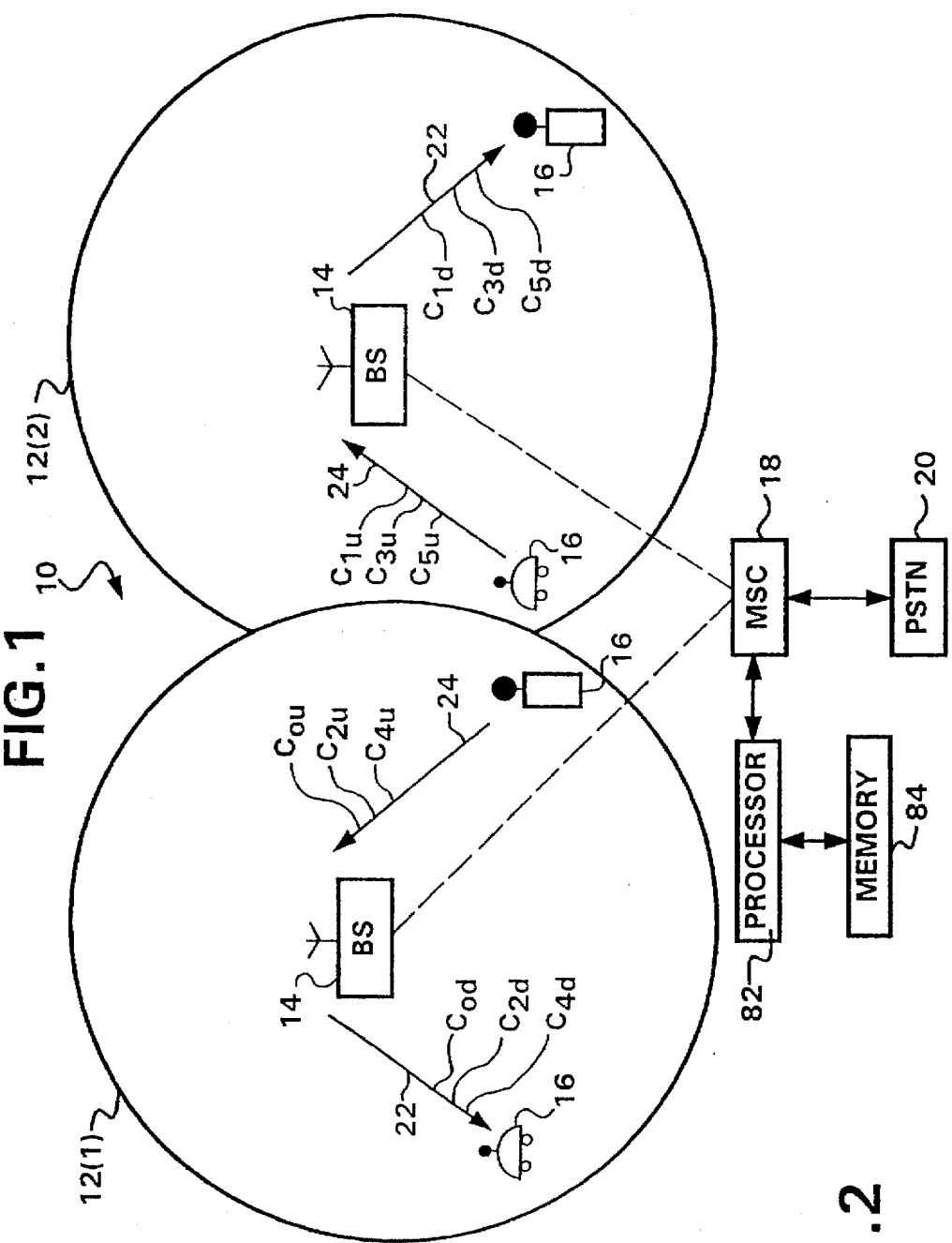
FIG. 1 is a simplified cell diagram for a digital cellular telephone system.

Reference is now made to FIG. 1 wherein there is illustrated a simplified cell diagram for a single layer digital cellular telephone network (IS-136, GSM or the like) 10 including two cells 12. Each cell includes at least one base station (BS) 14 for effectuating bidirectional radio frequency communications with mobile stations (MS) 16 operating within the network 10. The base stations 14 are connected to a mobile switching center (MSC) 18 that is connected to the public switched telephone network (PSTN) 20. The mobile switching center 18 operates to control base station 14 operation, maintain a record of mobile station location within the network 10 and switch, with the public switched telephone network 20, those cellular telephone calls originated by or terminated at the mobile stations 16.

It will, of course, be understood that cellular telephone networks like the network 10 typically include far more than two cells 10 in order to cover a designated service area. Furthermore, far more than four mobile stations 16 will be operating within the network 10, or any one cell 12 therein, at any one time. The depiction of two cells 12 and only four mobile stations 16 operating within the network 10 is accordingly to be taken as an illustration of, rather than a limitation on, the operation of the present invention.

Each cell 12 in the system is assigned a plurality of carrier frequencies c for carrying cellular communications between the base station 14 for that cell and any mobile stations 16 operating within, or proximately located to, the cell area. One half of the assigned carrier frequencies c comprise downlink carrier frequencies 22 for carrying communications from the base station 14 to the mobile stations 16 located within the cell 12. The remaining half of the assigned carrier frequencies c comprise uplink carrier frequencies 24 for carrying communications from the mobile stations 16 within the cell 12 to the base station 14. The carrier frequencies c are then paired (one uplink and one downlink per pair) and distributed in accordance with well known cellular architecture techniques amongst the plurality of base stations 14.

For example, consider a cellular system 10 like that shown in FIG. 1 wherein, for example, there are twelve carrier frequencies available for assignment between the two cells 12(1) and 12(2). Cell 12(1) may be assigned to three pairs of carrier frequencies $c_{0u}$, $c_{0d}$, $c_{2u}$, $c_{2d}$, $c_{4u}$ and $c_{4d}$, and cell 12(2), on the other hand, is assigned to three pairs of carrier frequencies $c_{1u}$, $c_{1d}$, $c_{3u}$, $c_{3d}$, $c_{5u}$ and $c_{5d}$. The subscripts "d" and "u" distinguish the downlink 22 and uplink 24 carriers, respectively, in each pair of carrier frequencies assigned to a cell 12.

Figure 2:
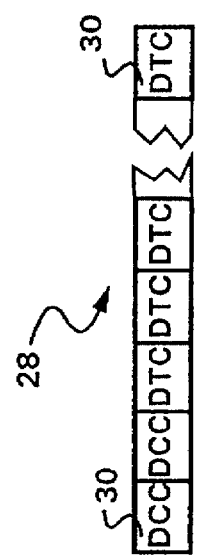
FIG. 2 illustrates an exemplary time division multiple access (TDMA) frame.

Referring now to FIG. 2, digital cellular systems utilize a time division multiple access (TDMA) communications protocol having one repeating TDMA frame 28 per (uplink or downlink) carrier frequency c. Each frame 28 includes a plurality of time slots 30. Certain ones of the time slots 30 are reserved as digital traffic channels (DTCs) for carrying user data (i.e., voice) burst communications, while the remaining time slots comprise digital control channels (DCCs) for carrying control signaling burst communications. A typical illustrative allocation of digital traffic channels and digital control channels within a TDMA frame 28 for a given carrier frequency c is illustrated in FIG. 2 wherein the first two time slots 30 are digital control channels, and the remaining time slots are digital traffic channels. In other TDMA frames 28 for use on other carrier frequencies c, however, only one time slot will be for a digital control channel, or alternatively all of the time slots 30 may comprise digital traffic channels.

Reference is now made to FIG. 3A wherein there are shown a collection of related timing diagrams 32 for communications bursts made within a digital cellular communications system implementing a repeating TDMA frame 28 including three time slots 30. The first timing diagram 32(1) illustrates the timing for the repeating frame 28 as maintained by the base station in a digital cellular system. The second timing diagram 32(2) illustrates the generation by a base station of a burst communication 34 to synchronize all mobile stations in the cell to the TDMA frame. The burst communication 34 is transmitted during a first time slot 30 of the TDMA frame 28, wherein the first time slot comprises a forward control channel on a downlink carrier frequency assigned to the base station. The third timing diagram 32(3) illustrates the delayed reception of the synchronizing burst communication 34 by a mobile station. This delay, caused by burst communication 34 propagation time, introduces a forward time synchronization error 36 offsetting the TDMA frame 28' as maintained at the mobile station from the TDMA frame 28 maintained at the base station. The offset TDMA frame 28' is illustrated in the fourth timing diagram 32(4).

The fifth timing diagram 32(5) illustrates the generation of a conventional length burst communication 38 (see, also FIG. 3B) by a mobile station in initially accessing the base station. The burst communication 38 includes a message portion 38a followed by a guard period (GP) 38b and is transmitted during a first time slot 30 of the offset mobile station TDMA frame 28', wherein the first time slot comprises a reverse control channel on an uplink carrier frequency for the base station that broadcast the synchronization burst 34. The sixth timing diagram 32(6) illustrates the delayed reception of the burst communication 38 by the base station, the delay resulting from the time taken for the communication to propagate from the mobile station. This delay, caused by burst communication 38 propagation time, introduces a reverse time synchronization error 40 in comparison to the TDMA frame 28', and further introduces a total time synchronization error 42 (comprising the sum of the forward 36 and reverse 40 time synchronization errors) in comparison to the base station TDMA frame 28 illustrated in diagram 32(1).

There exist instances wherein the total time synchronization error 42 exceeds permissible limits causing the conventional length burst communication 38 from the mobile station to be received at the base station with a timing reference partially interfering with the second time slot 30 in the TDMA frame 28. This is illustrated at 44 in FIG. 3 with respect to the timing diagrams 32(1) and 32(6) and is caused when the total time synchronization error 42 exceeds the length of the guard period 38b (FIG. 3B) in the conventional length burst communication 38. In such a case, the burst communication 38 may not be fully received due to interference from another burst communication received during the second time slot 30. Alternatively, the other burst communication in the second time slot may not be fully received due to interference from the late arriving first time slot burst communication. In either case, system operation is adversely affected, and such instances of time slot interference due to large time synchronization errors 42 should be avoided.

Figure 3B:
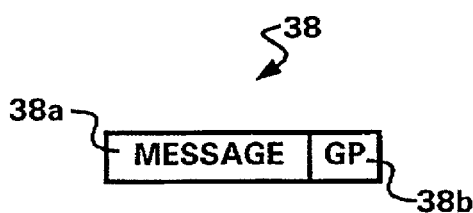
FIG. 3B illustrates the format of a conventional length burst communication.
Figure 3C:
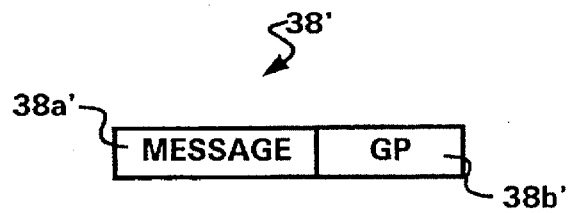
FIG. 3C illustrates the format of an abbreviated length burst communication.

To address the foregoing problem, it is well known to use an abbreviated length burst communication 38' (like that illustrated in broken lines in timing diagram 32(5) and shown in FIG. 3C) when the mobile station initially accesses the base station on the reverse control channel. Because this abbreviated burst communication 38' includes a message portion 38a' that is significantly shorter in duration than the message portion 38a of a conventional burst communication 38, and with a larger guard period 38b', it is received by the base station, as generally indicated at 46 and illustrated in timing diagram 32(6), successfully and fully within the first time slot even in instances of a significantly long time synchronization error 42, provided the error 42 does not exceed the length of the guard period 38b'. Such abbreviated length burst communications 38' are typically specified by cellular system operators for use by mobile stations at all times in all large cells where there is a chance that the total time synchronization error 42 could potentially result in subsequent time slot interference 44. To differentiate between cells requiring abbreviated length bursts and those cells that do not have such a requirement, base stations transmit a control signal on the forward digital control channel providing specifics of system operation including an indication that abbreviated length bursts should be used during initial mobile station access on the reverse digital control channel.

Figure 4:
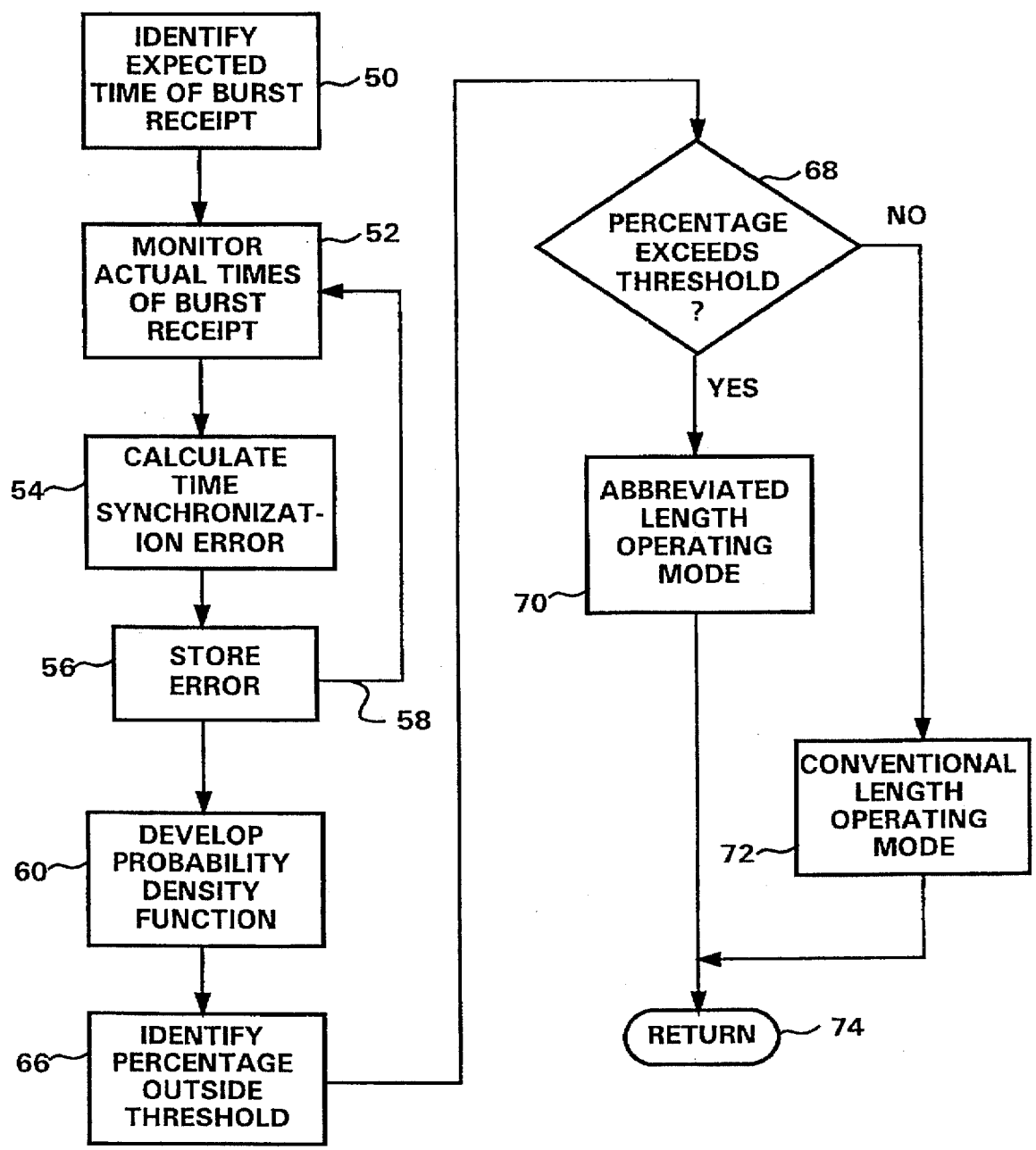
FIG. 4 is a flow diagram illustrating the manner of digital cellular system base station operation in accordance with the present invention.

Reference is now made to FIG. 4 wherein there is shown a flow diagram illustrating operation of the base stations in a cellular network in accordance with the present invention. At step 50, the base station identifies, in accordance with the TDMA frame, an expected time of receipt of initial access mobile station burst communications on the reverse digital control channel. Next, at step 52, the base station monitors the actual times of receipt of such burst communications. From the monitored actual and expected times of receipt, the base station calculates a time synchronization error in step 54 for each received burst communication by subtracting the expected time of receipt from the actual time of receipt. This time synchronization error accounts for both the forward time synchronization error (for propagation delays to the mobile station) and the reverse time synchronization error (for propagation delays from the mobile station). The calculated time synchronization errors are then stored in step 56 for future retrieval and processing. The procedures of steps 52, 54 and 56 are repeated (as illustrated by loop 58) for each received burst communication on the reverse digital control channel. From the plurality of time synchronization errors calculated and stored during a predetermined time period, the base station next processes the errors in step 60 to develop a probability density function plotting the number of instances of each length of time synchronization error.

Figure 5:
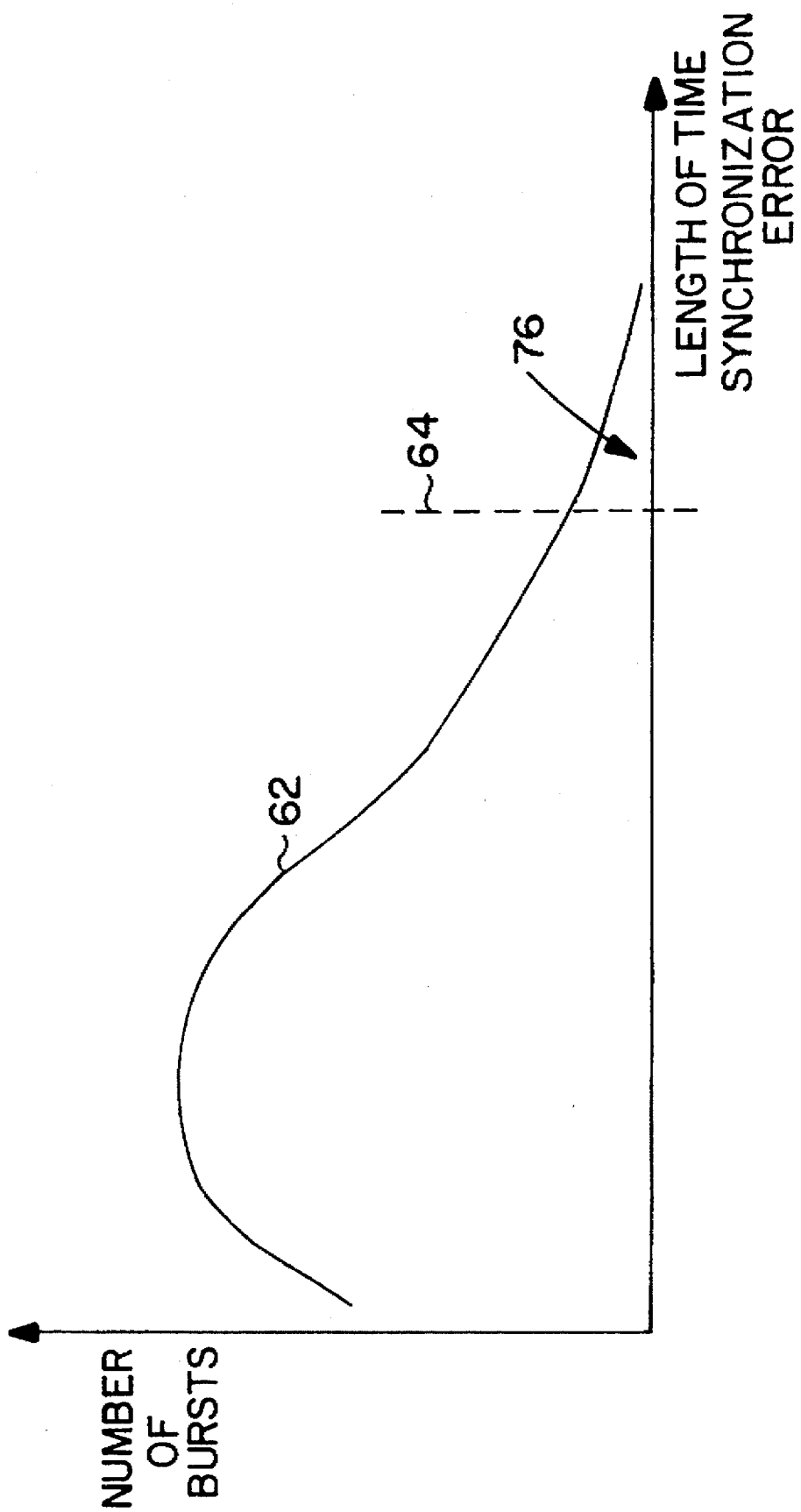
FIG. 5 illustrates an exemplary probability density function produced from measuring introduced time synchronization errors.

An exemplary probability density function is illustrated in FIG. 5, wherein the x-axis defines the length of the detected time detected synchronization error (step 54), and the y-axis defines the number of burst communications on the reverse digital control channel that experienced each length of error during the predetermined time period. The general shape of the curve 62 generated for the probability density function shows that as the length of the calculated time synchronization error increases, there are fewer and fewer instances of base station measurement of such an error. The density function further illustrates that for each base station, a maximum time synchronization error length threshold 64 is known in excess of which conventional length burst communications will interfere (see, generally at 44 in FIG. 3A) with a subsequent time slot in the TDMA frame.

Referring again to FIG. 4, the processing operation of the base station continues in step 66, following the development of the probability density function, to identify the percentage of the burst communications on the reverse digital control channel that exceed the maximum time synchronization error length threshold (see, generally, area 76 in FIG. 5). If the determined percentage exceeds a predetermined percentage value, as identified in step 68, then the base station orders all mobile stations in the cell area to operate in abbreviated length burst communication mode (step 70) using only abbreviated length burst communications 38' (FIG. 3C). On the other hand, if the determined percentage does not exceed the predetermined percentage value, the base station orders all mobile stations to operate in conventional length burst communication mode (step 72) using only conventional length burst communications 38 (FIG. 3B). The order in steps 70 or 72 to operate in conventional or abbreviated length mode is made by transmitting a control command signal from the base station to all proximate mobile stations over the forward digital control channel. The process then returns (step 74) to step 52 to continue with the monitoring of burst communication receipts and perhaps order a change in burst communication length to account for system changes and needs.

The operation of the base station in accordance with the process of FIG. 4 thus provides for the dynamic selection of the burst communication operating mode of the mobile stations. The lengths of the time synchronization errors are constantly being determined and processed to develop the probability density function for each predetermined time period. In instances where less than the predetermined percentage value of mobile stations access the base station in excess of the maximum time synchronization error length threshold, the mobile stations will efficiently utilize conventional length burst communications to initially access the base station. However, when more than the predetermined percentage value of mobile stations access the base station in excess of the maximum time synchronization error length threshold, perhaps due to increased mobile station presence at the fringes of the cell, the base station dynamically responds by specifying the use of abbreviated length burst communications, thus minimizing the likelihood that such communications will interfere with a subsequent time slot in the TDMA frame. A subsequent reduction in the measured time synchronization error may result in a dynamic return back to conventional length burst communication operating mode. The system thus dynamically adjusts to changes in mobile station location and density within a cell to select the most appropriate length for mobile station burst communications.

Figure 6:
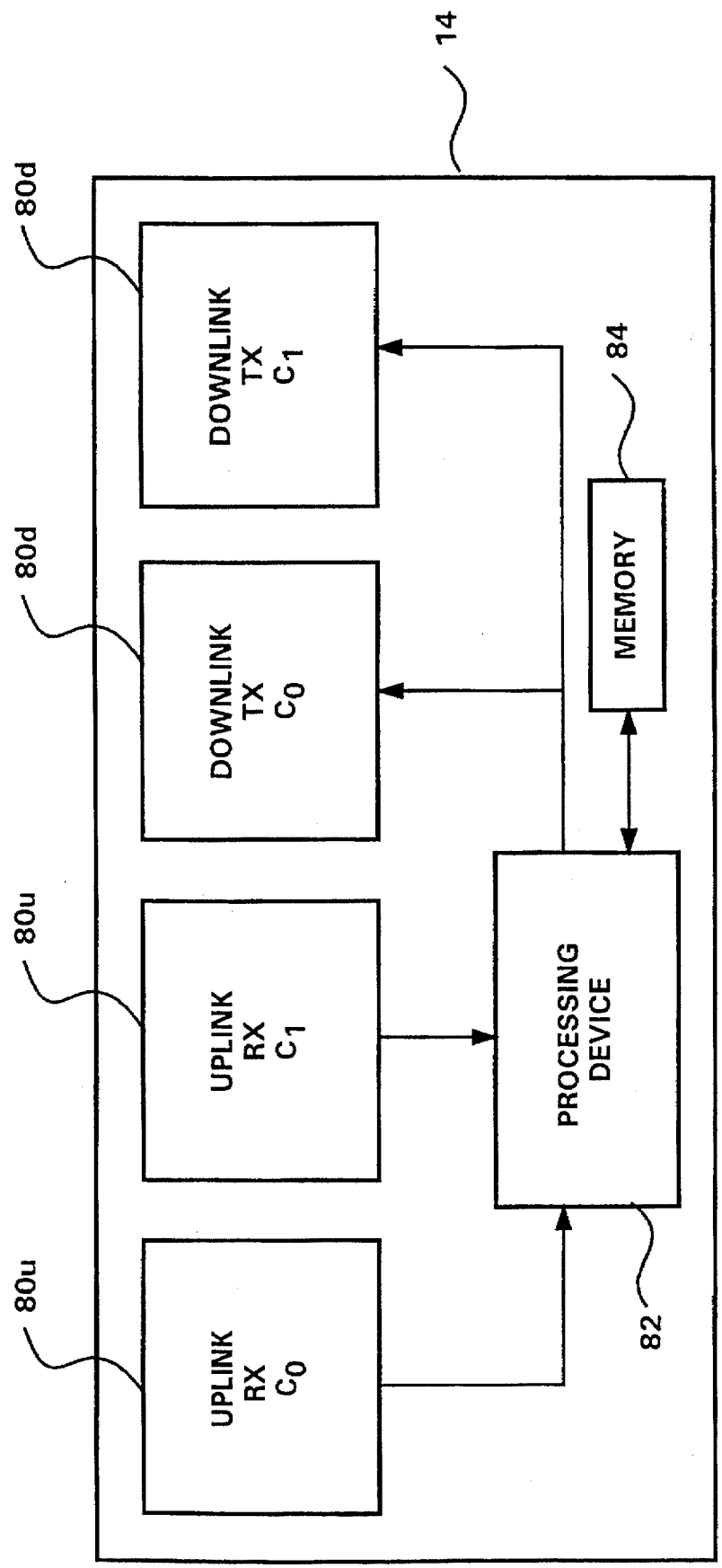
FIG. 6 is a simplified block diagram of a base station operating in accordance with the present invention.

Reference is now made to FIG. 6, wherein there is shown a block diagram of a base station operating in accordance with the process described above and illustrated in FIG. 4. The base station 14 includes a plurality of radio frequency transceivers 80 tuned to the carrier frequencies c assigned to the base station for use in carrying burst communications in accordance with a TDMA frame maintained for each carrier. The base station further includes a processing device 82 connected to each of the transceivers 80. In particular, the processing device 82 is connected to receive signals from uplink receivers 80$u$, especially those having TDMA frames that include digital control channels, to receive signals indicative of the receipt of burst communications from mobile stations on the reverse digital control channel of the TDMA frame (see, step 52 of FIG. 4).

The signals received from the uplink receivers 80$u$ are processed by the processing unit 82, in view of an expected time of arrival in accordance with the TDMA frame, to calculate and store a time synchronization error for each received reverse digital control channel burst communication (see, steps 54, 56 and 58 of FIG. 4). The plurality of calculated time synchronization errors are stored in a memory 84 connected to the processing device 82. The stored time synchronization errors calculated for burst communications received during a predetermined time period are processed by the processing device 82 to generate a probability density function (FIG. 5) identifying for each length of time synchronization error the number of instances of burst communication receipt with that error (see, step 60 of FIG. 4) during that predetermined time period.

The percentage of the burst communications received during the predetermined time period with a measured time synchronization error in excess of an error threshold is then calculated by the processing device 82 and compared with a threshold percentage (see, steps 66 and 68 in FIG. 4). If the calculated percentage exceeds the threshold percentage, this is indicative of an unacceptable (from the system operator point of view) number of instances of excessive time synchronization errors because there is a corresponding significant increase in the likelihood that a reverse control channel burst communication from a mobile station during a first time slot in the TDMA frame will adversely interfere with burst communications in an adjacent, second time slot. The processing device 82 then accordingly signals the downlink transmitters 80$d$ in the base station 14, comprising those having TDMA frames that include digital control channels, to generate and transmit a command signal specifying mobile station operation within the cell only in the abbreviated length burst communication operating mode (see, step 70 in FIG. 4). Conversely, if the calculated percentage does not exceed the threshold percentage, the processing device 82 instead signals the downlink transmitters 80$d$ in the base station 14 to generate and transmit a command signal specifying mobile station operation within the cell only in the conventional length burst communication operating mode (see, step 72 in FIG. 4).

When operating in the abbreviated length burst communication operating mode, there is a significant decrease experienced in the capacity of the reverse digital control channel. Because thirty to forty percent decreases in capacity on the reverse digital control channel are not uncommon when operating in the abbreviated mode, the processing device 82 continues to monitor the probability density function in view of the error and percentage thresholds to switch back to conventional length burst communication operating mode whenever possible. Thus, dynamic control over mobile station burst communication operating mode within the cell is exercised by the operation of the base station 14 in accordance with the present invention.

It will, of course, be understood that the processing device 82 and the memory 84 may alternatively be located in the mobile switching center 18 as shown in FIG. 1. In such a configuration, the base stations 14 operate to calculate the time synchronization errors which are reported to the mobile switching center 18. The errors are then processed in making dynamic determinations of burst communication length on the reverse control channel.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. In particular, it should be recognized that the monitoring of channels in digital cellular systems for time slot interference may be performed in accordance with the present invention with respect to any of the time slots within the repeating TDMA frame to effectuate dynamic control over mobile station burst communication length.

What is claimed is:

1. In a digital cellular system wherein mobile stations transmit burst communications to a base station, a method for dynamically controlling a length of mobile station burst communications, comprising the steps of:

comparing a time of receipt for certain ones of a plurality of received mobile station burst communications to an expected time of receipt to identify a time synchronization error for each of the certain received burst communication;

processing the identified time synchronization errors to determine a percentage of the certain received burst communications having a time synchronization error in excess of an error threshold; and instructing the mobile stations to: use a first message length for the certain burst communications if the determined percentage does not exceed a threshold percentage; or to instead use a second message length, shorter than the first length, if the determined percentage does exceed the threshold percentage.

2. The method as in claim 1 wherein the certain burst communications are transmitted in accordance with a time division multiple access (TDMA) frame, the frame having a plurality of time slots including reverse control channel time slots, and the method further including the step of receiving the certain burst communications transmitted during one of the reverse control channel time slots.

3. The method as in claim 2 wherein the certain burst communications transmitted during one of the reverse control channel time slots and having an identified time synchronization error in excess of the error threshold are also partially transmitted during another one of the time slots in the TDMA frame.

4. The method as in claim 1 wherein the step of comparing comprises the steps of:

setting the expected time of receipt of the certain burst communications;

monitoring for receipt of each certain burst communication to identify an actual time of receipt; and subtracting the expected time of receipt from the actual time of receipt to identify the time synchronization error for that received certain burst communication.

5. The method as in claim 1 wherein the step of processing comprises the step of developing a probability density function identifying for each time synchronization error the number of instances of the certain burst communications identified as having that error.

6. The method as in claim 5 wherein the step of processing further comprises the steps of:

determining the percentage of the received certain burst communications having a time synchronization error in excess of the error threshold; and comparing the determined percentage to the threshold percentage.

7. The method as in claim 1 wherein the step of instructing comprises the step of broadcasting a burst communication command to the mobile stations specifying the use of either the first or second message lengths for the certain burst communications.

8. The method as in claim 7 wherein the burst communication command transmitted to the mobile station is transmitted in accordance with a time division multiple access (TDMA) frame, the frame having a plurality of time slots including forward control channel time slots, and the step of broadcasting comprises the step of transmitting the burst communication command during one of the forward control channel time slots.

9. The method as in claim 1 further including the step of storing the identified time synchronization errors over a predetermined period of time, the step of processing comprising the step of processing the stored time synchronization errors to determine a percentage of the received certain burst communications during the predetermined time period having a time synchronization error in excess of the error threshold.

10. A base station for use in a digital cellular telephone system, wherein mobile stations transmit to the base station burst communications having a length dynamically set by the base station, comprising:

an uplink transceiver for receiving mobile station burst communications;

a processing device connected to the uplink transceiver and operating to:

compare a time of receipt for certain received mobile station burst communications to an expected time of receipt to identify burst communication time synchronization errors; and process the identified time synchronization errors to determine a percentage of the received certain burst communications having time synchronization errors in excess of an error threshold; and generate an operating command specifying the use of a first message length for the certain burst communications if the determined percentage does not exceed a threshold percentage, or a second message length, shorter than the first length, if the determined percentage does exceed the threshold percentage; and a downlink transceiver connected to the processing device for broadcasting the generated operating command to the mobile stations as a burst communication.

11. The base station as in claim 10 wherein the uplink transceiver implements a time division multiple access (TDMA) frame, the frame having a plurality of time slots including reverse control channel time slots, and wherein the certain burst communications are transmitted during one of the reverse control channel time slots.

12. The base station as in claim 11 wherein the certain burst communications transmitted during one of the reverse control channel time slots and having an identified time synchronization error in excess of the error threshold are also partially transmitted during another one of the time slots in the TDMA frame.

13. The base station as in claim 10 further including a memory connected to the processing device for storing the identified time synchronization errors over a predetermined period of time, the processing device further operating to process the stored time synchronization errors to determine a percentage of the received certain burst communications during the predetermined time period having a time synchronization error in excess of the error threshold.

14. The base station as in claim 10 wherein the downlink transceiver implements a time division multiple access (TDMA) frame, the frame having a plurality of time slots including forward control channel time slots, and wherein the burst communication broadcasting the generated operating command is transmitted during one of the forward control channel time slots.

15. A method for dynamically selecting a length for certain mobile station burst communications in a cellular telephone system, comprising the steps of:

noting a time of receipt for each of a plurality of certain mobile station burst communications;

first comparing each of the noted times of receipt to an expected time of receipt to identify time synchronization errors;

deriving a density function from the time synchronization errors identified for the certain mobile station burst communications received during a predetermined time period;

computing from the density function a percentage of the certain mobile station burst communications having time synchronization errors in excess of an error threshold;

second comparing the computed percentage to a threshold percentage; and selecting a first length for the certain mobile station burst communications if the computed percentage does not exceed the threshold percentage; or alternatively selecting a second, shorter length for the certain mobile station burst communications if the computed percentage exceeds the threshold percentage.

16. The method of claim 15 wherein the alternative steps of selecting include the step of broadcasting a burst communication command to the mobile stations specifying the selected first or second length for the certain mobile station burst communications.

17. The method as in claim 16 wherein the cellular telephone system comprises a time division multiple access (TDMA) system, the certain mobile station burst communications are transmitted on a reverse control channel of a TDMA frame, and the burst communication command is transmitted on a forward control channel of a TDMA frame.

18. A digital mobile telephone system comprising mobile stations and a base station, wherein the mobile stations transmit certain burst communications to the base station during a given one of a plurality of time slots within a time division multiple access (TDMA) frame, and wherein the system includes:

means for processing a plurality of received certain mobile station burst communications in view of an expected time of receipt to identify time synchronization errors in the TDMA frame and to determine whether the identified time synchronization errors exceed an error threshold, the error threshold set to point out those certain mobile station burst communications, if having a conventional message length, that would be received partially during both the given one of the time slots and a subsequent one of the time slots in the TDMA frame; and means for transmitting a burst communications command to the mobile stations instructing the use of an abbreviated message length, less than the conventional length, for each certain mobile station burst communication in the event that, and only for so long as, an excessive number of the certain mobile station burst communications are determined to have time synchronization errors exceeding the error threshold.

19. The system of claim 18 wherein the given one of the time slots in the TDMA frame for mobile station burst communications comprises a reverse digital control channel.

20. A digital cellular telephone system, comprising:

a plurality of base stations each having:

an uplink transceiver for receiving mobile station burst communications;

a first processing device connected to the uplink transceiver and operating to compare a time of receipt for certain received mobile station burst communications to an expected time of receipt to identify burst communication time synchronization errors; and a downlink transceiver for broadcasting an operating command to the mobile stations specifying message length for certain burst communication; and a mobile switching center having a second processing device operating to determine a percentage of the received certain burst communications having identified time synchronization errors in excess of an error threshold, and generate the operating command specifying the use of a first message length for the certain burst communications if the determined percentage does not exceed a threshold percentage, or specifying a second message length, shorter than the first length, if the determined percentage does exceed the threshold percentage.

21. The system as in claim 10 wherein the uplink transceiver implements a time division multiple access (TDMA) frame, the frame having a plurality of time slots including reverse control channel time slots, and wherein the certain burst communications are transmitted during one of the reverse control channel time slots.

22. The system as in claim 11 wherein the certain burst communications transmitted during one of the reverse control channel time slots and having an identified time synchronization error in excess of the error threshold are also partially transmitted during another one of the time slots in the TDMA frame.

23. The system as in claim 10 further including a memory connected to the second processing device for storing the identified time synchronization errors over a predetermined period of time, the processing device further operating to process the stored time synchronization errors to determine a percentage of the received certain burst communications during the predetermined time period having a time synchronization error in excess of the error threshold.

24. The system as in claim 10 wherein the downlink transceiver implements a time division multiple access (TDMA) frame, the frame having a plurality of time slots including forward control channel time slots, and wherein the burst communication broadcasting the generated operating command is transmitted during one of the forward control channel time slots.

* * * * *